United States Patent [19]

Turetsky

[11] 4,107,045
[45] Aug. 15, 1978

[54] FILTER-PURIFIER CARTRIDGE

[76] Inventor: Isadore Turetsky, 23940 Welby Way, Los Angeles, Calif. 91307

[21] Appl. No.: 790,844

[22] Filed: Apr. 25, 1977

[51] Int. Cl.² .................. B01D 23/06; B01D 27/02
[52] U.S. Cl. .................. 210/266; 210/282; 210/314; 210/489
[58] Field of Search .......... 210/266, 282, 314, 316, 210/317, 335, 339, 448, 451, 489, 315

[56] References Cited

U.S. PATENT DOCUMENTS

| 3,561,602 | 2/1971 | Molitor | 210/335 |
| 3,585,130 | 6/1971 | Gregory | 210/266 |
| 3,750,888 | 8/1973 | Rinaldo | 210/451 |

*Primary Examiner*—Charles N. Hart
*Assistant Examiner*—Ivars Cintins

[57] ABSTRACT

A filter-purifier cartridge arranged so that a self contained purifier element is mounted axially at one end of a tubular filter having a hollow core, said hollow core communicating with the inlet of the purifier element, thereby combining the filtering efficiency offered by a radial flow through the filter element with an axial flow within the purifier element.

3 Claims, 2 Drawing Figures

FILTER-PURIFIER CARTRIDGE

FIELD OF THE INVENTION

This invention relates to a filter-purifier cartridge, and since it finds particular utility in the field of water filtration and purification, embodiments thereof adapted for such use are hereinafter described as illustrative of the invention and the advantages thereof, it being understood that my invention is not restricted to such use.

There is a growing demand for an inexpensive filter element that can be periodically discarded, in combination with an economical purifier element. Both the efficiency and life of a combined filter and purifier cartridge depend on the mass of purifying medium used and the surface area of the filter. The difficulty arises from the fact that in the present type of filter-purifier cartridges the fluid does not flow uniformly through the granular purifying medium, whereas in an axial flow assembly the relatively small surface area of the filter decreases the life expectancy of the cartridge.

OBJECTS OF THE INVENTION

An object of my invention is to provide a water filter-purifier cartridge which may be readily removed when its efficiency is impaired, and replaced by a new cartridge.

Another object of my invention is the provision for recharging the purifier element with new purifying medium resulting in a marked savings as compared to a throwaway cartridge.

Still another object of my invention is to combine the efficiency offered by a radial flow through the filter element with an axial flow through the purifier element.

An embodiment of my invention capable of accomplishing the foregoing objects and providing the advantages contemplated by them and other advantages will become more apparent after studying the detailed description of the following specification which may be readily understood by reference to the accompanying drawings.

DETAILED DESCRIPTION OF THE DRAWINGS

Figure 2:
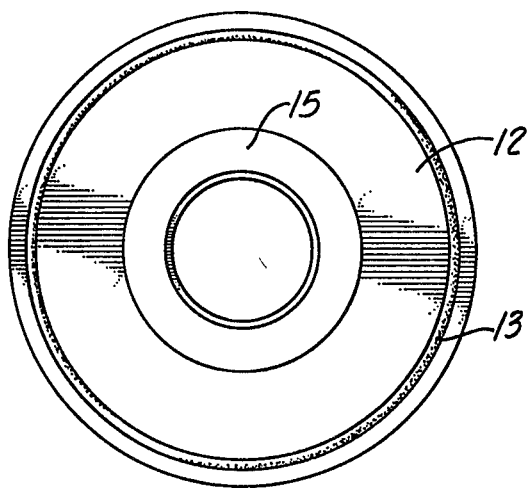
FIG. 2 is a plan view of the filter-purifier cartridge identified in FIG. 1.
Figure 1:
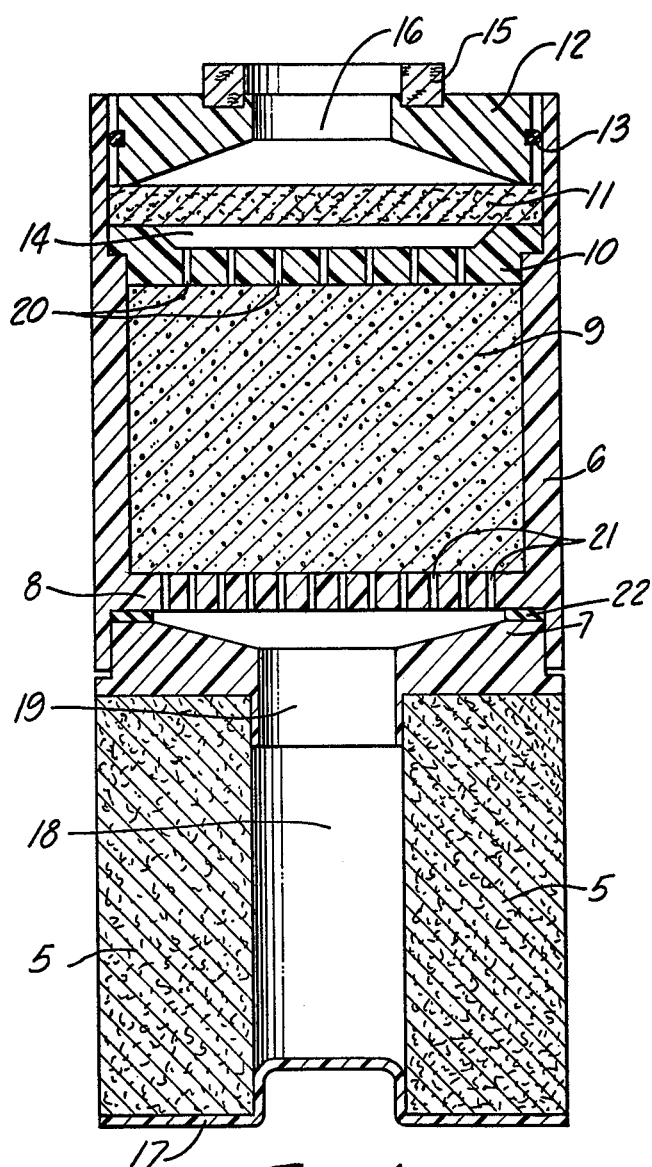
FIG. 1 is a side elevation sectional view of an intergrated filter-purifier cartridge of my invention.

Referring to the drawings which are for illustrative purposes only, the numeral 5 indicates a permeable porous tubular filter having a hollow core 18; cylindrical vessel 6 having a perforated bottom 8 with the cylindrical wall section of said vessel 6 extending beyond the perforated bottom 8, the end sections of vessel 6 being recessed internally. The adapter-spacer 7 is positioned at one end of the tubular filter 5, wherein the protruding section surrounding the passage 19 of said adapter-spacer 7 is inserted into the hollow core 18 of the tubular filter 5 so that passage 19 communicates with the hollow core 18 of said tubular filter 5. The other end of adapter-spacer 7 being inserted into the internally recessed lower end section of cylindrical vessel 6 bears against a ring gasket 22 which rests against the perforated bottom 8. A sealing disk 17 having a protruding hub inserted into the opposite end of hollow core 18 of said tubular filter 5 seals said hollow core 18. The purifying medium 9 is contained within the cylindrical vessel 6 by means of the perforated bottom 8 having a series of perforations 21, and a perforated disk 10 having a series of perforations 20 and an offset rimmed section resting against the shoulder of the internally recessed upper section of cylindrical vessel 6. A permeable porous disk 11 is positioned atop the offset rimmed section of perforated disk 10 to form chamber 14 between said perforated disk 10 and said porous disk 11. A cylinder sealing ring 12 having an "O" ring seal 13 contained in a continuous groove formed at the outer circumference of said sealing ring 12 is inserted into the core of the upper internally recessed section of cylindrical vessel 6 and bears against the porous disk 11. A ring gasket 15 is contained in a groove at the top of sealing ring 12 around the discharge port 16 of the assembled cartridge.

In operation the filter-purifier cartridge as shown is subjected to axial compression after said cartridge is inserted in its housing. The housing is not part of my invention and is not shown. It will be evident that, while the filter-purifier cartridge is not illustrated, one skilled in the art can easily adapt the cartridge to a cylindrical housing having axially aligned inlet and outlet ports. One skilled in the art will also note that embodiments of the assembly as shown are adaptable to a common type of filter housing which is screwed onto a double ported end section having an "O" ring to seal the open end of said housing.

With the cartridge assembled as illustrated water to be filtered and purified passes radially through the permeable porous tubular filter 5 and enters the hollow core 18 of said tubular filter. The water then flows through the passage 19 of the adapter-spacer 7 and is distributed to the perforations 21 of the perforated bottom 8. The flow continues through said perforations 21 and thence through the purifying medium 9. The fluid then flows through the perforations 20 of disk 10 and enters chamber 14 where the flow continues through the permeable porous disk 11 and exits through the discharge port 16. The ring gasket 15 surrounding the cartridge port 16 and the entrance of the cartridge housing discharge passage prevents any unprocessed water from being discharged through said housing discharge passage.

The present invention contemplates alternate embodiments which can include a tubular filter having a fiber winding on a reticulated core. Similarly, a perforated hollow core being wound with fiber or having a pleated resin impregnated filter paper formed around said core can be used as the tubular filter. In addition to offering a large area to the fluid entering the perforations 21 and preventing unfiltered water from entering said perforations, the insertable adapter-spacer 7 as shown enables the use of tubular filters having differing diameter core dimensions by simply inserting an adapter-spacer with the necessary measurements. If a specific size tubular filter is to be used the adapter-spacer can be integrally formed at the end section below the perforated bottom of the cylindrical purifier vessel.

While those embodiments of this invention hereinbefore illustrated and described are fully capable of performing the objects and accomplishing the advantages primarily started, it will be understood that this invention is not restricted to the specific embodiments hereinbefore set forth but includes all modifications coming within the scope of the claims that follow.

I claim:

1. A filter-purifier cartridge for fluids, having a separable self contained cylindrical vessel containing granular purifying media supported by a perforated bottom within said vessel, the cylindrical wall section of said vessel extending beyond said perforated bottom; a perforated disk having an offset rimmed section inserted in an internally recessed upper section of said cylindrical vessel and enclosing the granular purifying media within said vessel; a permeable porous disk resting against the offset rimmed section of the previously inserted perforated disk, a sealing ring resting against said permeable porous disk; a frictional seal disposed between said sealing ring and the inside wall of said cylindrical vessel; a frictional seal contained at the exposed end of said sealing ring and encircling the port of said sealing ring, said port being the discharge passage of the purifier-filter element; the end section of said cylindrical vessel containing the perforated bottom being axially mounted above one end of a tubular filter by means of a hollow adapter-spacer which seals said end of tubular filter, said adapter-spacer disposed between said tubular filter and a ring gasket resting against the perforated bottom of said cylindrical vessel, the interior of said vessel communicating with the hollow core of said tubular filter by means of a passage through said adapter-spacer, and a closure disposed at the remaining exposed end of said tubular filter.

2. A filter purifier cartridge as claimed in claim 1, wherein: the adapter-spacer is defined as a hollow cylinder having an integrally formed collar intermediate its ends, the outside diameter of the cylindrical section of one side of said collar being sized to fit the hollow core of the tubular filter, the outside diameter of the cylindrical section on the alternate side of said collar being sized to fit into the hollow cylindrical vessel extending below the perforated bottom of said vessel.

3. A filter-purifier cartridge as claimed in claim 1, wherein: the closure at the remaining exposed end of said tubular filter is defined as a disk having a raised hub, said hub being inserted into the hollow core of said tubular filter.

* * * * *